United States Patent
Su et al.

(10) Patent No.: US 9,497,064 B2
(45) Date of Patent: Nov. 15, 2016

(54) METHOD AND APPARATUS FOR TRANSPORTING ULTRA-HIGH-SPEED ETHERNET SERVICE

(71) Applicant: HUAWEI TECHNOLOGIES CO., LTD., Shenzhen (CN)

(72) Inventors: Wei Su, Amsterdam (NL); Chiwu Ding, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 348 days.

(21) Appl. No.: 14/187,716

(22) Filed: Feb. 24, 2014

(65) Prior Publication Data

US 2014/0177652 A1    Jun. 26, 2014

Related U.S. Application Data

(63) Continuation of application No. PCT/CN2011/078858, filed on Aug. 24, 2011.

(51) Int. Cl.
*H04L 29/06* (2006.01)
*H04L 12/801* (2013.01)
(Continued)

(52) U.S. Cl.
CPC ....... *H04L 29/06993* (2013.01); *H04J 3/1658* (2013.01); *H04L 7/0016* (2013.01);
(Continued)

(58) Field of Classification Search
CPC ........... H04L 29/06993; H04L 7/0016; H04L 47/16; H04L 2203/0085; H04L 3/16; H04J 3/1658; H04J 3/0602; H04J 2203/0085; H04J 2203/0094; H04J 3/076; H04J 3/16
See application file for complete search history.

(56) References Cited

U.S. PATENT DOCUMENTS 5,521,928 A * 5/1996 Worsley ................. H04L 12/44
                                                        370/362
7,295,639 B1 * 11/2007 Cory ....................... H04L 25/14
                                                        370/516
(Continued)

FOREIGN PATENT DOCUMENTS

CN            1812315 A      8/2006
CN          101478704 A      7/2009
(Continued)

OTHER PUBLICATIONS

Zi-xuc Liu et al., "Research and analysis on 1000E PCS Multi-lane distribution scheme", China Academic Journal Electronic Publishing House, Oct. 2009, 4 pp.
(Continued)

*Primary Examiner* — Ian N Moore
*Assistant Examiner* — Latresa McCallum
(74) *Attorney, Agent, or Firm* — Staas & Halsey LLP

(57) ABSTRACT

The present invention discloses a method and an apparatus for transporting an ultra-high-speed Ethernet service. The method includes: distributing an ultra-high-speed Ethernet service data flow into n virtual channels, where a rate of the ultra-high-speed Ethernet service data flow is higher than a rate of 100GE; synchronously adding a marker to data of each of the n virtual channels; mapping the data of the n virtual channels channel by channel; and framing and transmitting the data of the n virtual channels. The method adopts a channelized transport manner to transparently transport an ultra-high-speed Ethernet service, and implements mapping processing on the ultra-high-speed Ethernet service, so as to reduce its complexity to a level for processing a low-rate Ethernet service and reduce implementation difficulty.

10 Claims, 12 Drawing Sheets

| Column \ Row | 1 | ... | 7 | 8 | ... | 14 | 15 | 16 | 17 | ... | 3824 | 3825 | ... | 4080 |
|---|---|---|---|---|---|---|---|---|---|---|---|---|---|---|
| 1 | (M) Frame alignment signal | | | OTUk overhead | | | | | OPUk overhead | OPUk payload | | Forward error correction | | |
| 2 | ODUk overhead | | | | | | | | | | | | | |
| 3 | | | | | | | | | | | | | | |
| 4 | | | | | | | | | | | | | | |

(51) Int. Cl.
H04J 3/16 (2006.01)
H04L 7/00 (2006.01)
H04J 3/06 (2006.01)

(52) U.S. Cl.
CPC ............ H04L 47/16 (2013.01); *H04J 3/0602* (2013.01); *H04J 2203/0085* (2013.01); *H04J 2203/0094* (2013.01)

(56) References Cited

U.S. PATENT DOCUMENTS

| | | | |
|---|---|---|---|
| 2002/0176450 | A1 | 11/2002 | Kong et al. |
| 2007/0248121 | A1* | 10/2007 | Zou .................... H04J 3/1611 370/498 |
| 2011/0170864 | A1 | 7/2011 | Tani et al. |
| 2011/0188514 | A1* | 8/2011 | Schmitz ............. H04L 41/0816 370/466 |

FOREIGN PATENT DOCUMENTS

| | | |
|---|---|---|
| CN | 101695144 A | 4/2010 |
| CN | 101841740 A | 9/2010 |
| EP | 2 228 930 | 9/2010 |
| WO | 2010/145404 A1 | 12/2010 |

OTHER PUBLICATIONS

International Search Report mailed May 31, 2012 in corresponding International Patent Application No. PCT/CN2011/078858.
Cvijetic, Milorad, Ivan B. Djordjevic, Ting Wang, and Lei Xu, "Proposal for Beyond 100-Gb/s Optical Transmission Based on Bit-Interleaved LDPC-Coded Modulation," *IEEE Photonics Technology Letters*, Jun. 15, 2007, pp. 874-876, vol. 19, No. 12, Department of Electrical and Computer Engineering, University of Arizona, Tucson, Arizona with NEC Corporation of America, Herndon, Virginia, and NEC Laboratories America, Princeton, New Jersey.
Chong, Zhang, "Research on and Implementation of Optical Transport Network Mapping Technologies," *Master Thesis: Institute of Information Photonics and Optical Communications*, Jan. 2010, pp. i-v; 1-30, Beijing University of Posts and Telecommunications, Beijing, China.
Draft of "Amendment: Media Access Control Parameters, Physical Layers and Management Parameters for 40 Gb/s and 100 Gb/s Operation," *IEEE P802.3ba™ D3.2: Draft Standard for Information Technology—Telecommunications and information exchange between systems—Local and metropolitan area networks—Specific Requirements Part 3: Carrier Sense Multiple Access with Collision Detection (CSMA/CD) Access Method and Physical Layer Specifications*, Mar. 24, 2010, pp. 1-481, LAN/MAN Standards Committee of the IEEE Computer Society, New York, New York.
Bruno, Gianmarco, Marco Camera, and Bengt-Erik Olsson, "Beyond 100Gbit/s: System Implications towards 400G and 1T," PowerPoint presentation at the *2010 36th European Conference and Exhibition of Optical Communication (ECOC)*, Sep. 19-23, 2010, PowerPoint slides 1-29, DU IP & Broadband PDU Optical Networks with Ericsson Research, Torino, Italy.
Qiuyou, Wu, "Multi-services OTN Evolution," *China Academic Journal Electronic Publishing House*, Oct. 9, 2010, pp. 21-25, vol. 8, No. 9, Huawei Technologies Co., Ltd., Shenzhen, China.
"Interfaces for Optical Transport Network (OTN) Amendment 2," *ITU-T G709/Y1331 Series G: Transmission Systems and Media, Digital Systems and Networks Digital terminal equipments—General; Series Y: Global Information Infrastructure, Internet Protocol Aspects and Next-Generation Networks Internet protocol aspects—Transports*, Apr. 2011, pp. 1-22, International Telecommunication Union.
Hui, Chen, Liu Jianghao, and Ding Rongze, "Application and Development of OTN Technologies in MAN," *China Academic Journal Publishing House*, May 4, 2011, pp. 51-54, vol. 6, Issue 6, Ministry of Industry and Information Technology Research Institute of Telecommunications with MIIT Telecom Planning Institute.
International Search Report issued May 31, 2012, in corresponding International Patent Application No. PCT/CN2011/078858.
Chinese Search Report issued May 23, 2013, in corresponding Chinese Patent Application No. 201180001376.9.
Chinese Office Action issued May 31, 2013, in corresponding Chinese Patent Application No. 201180001376.9.
Extended European Search Report issued on May 22, 2014 in corresponding European Application No. 11 86 0337.2.

* cited by examiner

METHOD AND APPARATUS FOR TRANSPORTING ULTRA-HIGH-SPEED ETHERNET SERVICE

CROSS-REFERENCE TO RELATED APPLICATIONS

This application is a continuation of International Application No. PCT/CN2011/078858, filed on Aug. 24, 2011, of which is hereby incorporated by reference in its entirety.

TECHNICAL FIELD

The present invention relates to the field of communications technologies, and in particular, to a method and an apparatus for transporting an ultra-high-speed Ethernet service.

BACKGROUND

An OTN (optical transport network, optical transport network), as a core technology of a next-generation transport network, includes technical specifications at an electrical processing layer and an optical processing layer, has OAM (operation, administration and maintenance, operation, administration and maintenance), TCM (Tandem Connection Monitoring, tandem connection monitoring) and out-of-band FEC (forward error correction, forward error correction) capabilities, is capable of achieving flexible scheduling and management of large-capacity services, and gradually becomes a mainstream technology for a backbone transport network. At the electrical processing layer, a "digital wrapper" structure defined by the OTN technology can implement management and monitoring on a client signal.

As shown in FIG. 1, an OTN frame is a 4080×4 modular structure, including a frame alignment signal (frame alignment signal, FAS) byte, which provides a function for locating the OTN frame. An OTUk OH (optical channel transport unit-k overhead, OTUk overhead) is overhead bytes of an optical channel transport unit, which provides a network management function at an optical channel transport unit level. An ODUk OH (optical channel data unit-k overhead, ODUk overhead) is overhead bytes of an optical channel data unit, which provides a maintenance and operation function. An OPUk OH (optical channel payload unit-k overhead, OPUk overhead) is overhead bytes of an optical channel payload unit, which provides a client signal adapting function. An OPUk (optical channel payload unit-k) is the optical channel payload unit, which is used for carrying a client signal. An FEC (forward error correction) is forward error correction bytes, which provides an error detection and correction function. A coefficient k indicates a supported bit rate and different types of OPUk, ODUk, and OTUk. k=1 indicates that a bit rate rank is 2.5 Gbit/s; k=2 indicates that a bit rate rank is 10 Gbit/s; k=3 indicates that a bit rate rank is 40 Gbit/s; k=4 indicates that a bit rate rank is 100 Gbit/s; and k=flex indicates an any-rate bit rate. An ODUflex frame specified by ITU-T is capable of carrying an any-rate CBR (constant bit rate, constant bit rate) service and a packet service.

Presently, a 100GE standard 802.3ba and an OTN OTU4 (100 Gbit/s) standard G709v3 have been completed. However, with rapid growth of services, an ultra-100GE (such as 400GE and 1TE) service is ready; to meet service transport requirements, a transport solution of a corresponding rate level needs to be made at the optical transport layer; for example, an OTU5 (400 Gbit/s) is defined to transport a 400GE service and achieve a long-distance transmission over a 400G WDM optical module. Further, because spectral efficiency has a limit, a rate of an optical transport module is difficult to increase infinitely. Presently, the utilization of spectrum efficiency by a long-distance WDM optical module at a rate level of 100 Gbit/s has been close to a limit, to continue evolution of a 100 Gbit/s network, considering technical feasibility, an ultra-100 Gbit/s transport network will adopt a 400 Gbit/s long-distance WDM optical module. With rapid growth of services, such as the emerging of 400GE and 1TE services, these large-capacity services exceed a current single-wavelength transport capability of a transport network, and therefore, a preferable optical transport solution needs to be made under existing conditions to solve an actual problem of transporting an ultra-high-speed Ethernet service (such as 400GE and 1TE) in an OTN.

SUMMARY

Embodiments of the present invention provide a method and an apparatus for transporting an ultra-high-speed Ethernet service, which solve a technical problem of how to transport an ultra-high-speed Ethernet service at a low cost A method for transporting an ultra-high-speed Ethernet service, includes: distributing a ultra-high-speed Ethernet service data flow into n virtual channels, where a rate of the ultra-high-speed Ethernet service data flow is higher than 100GE; synchronously adding a marker to data of each of the n virtual channels; mapping the data of the n virtual channels channel by channel; and framing and transmitting the data of the n virtual channels.

An apparatus for transporting an ultra-high-speed Ethernet service, includes: a service distributing submodule, configured to distribute an ultra-high-speed Ethernet service data flow into n virtual channels, where the ultra-high-speed Ethernet service data flow is higher than 100GE; a marker adding submodule, configured to add a marker to data of each of the n virtual channels synchronously; a mapping submodule, configured to map the data of the n virtual channels channel by channel; a framing submodule, configured to frame the data of the n virtual channels; and a transmitting submodule, configured to transmit the framed data of the n virtual channels.

The method adopts a channelized transport manner to transparently transport an ultra-high-speed Ethernet service, and implements mapping processing on the ultra-high-speed Ethernet service, so as to reduce its complexity to a level for processing a low-rate Ethernet service and reduce implementation difficulty.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

In the embodiments of the present invention, the following two manners may be adopted to transport an ultra-high-speed Ethernet service.

1. Distribute a received data flow into n virtual channels in a unit of 66B block, synchronously add a marker LLM (Logical Lane Marker) to an align marker AM (align marker) of each of the n virtual channels, map the n virtual channels one to one to n ODTUk.mTSs (optical channel data tributary unit-k including m time slots, optical channel data tributary unit-k including m time slots), multiplex the n ODTUk.mTSs to multiple OPUks, encapsulate each OPUk into an ODUk and an OTUk in turn, and transport the OTUks over multiple OTUk DWDM (Dense Wavelength Division Multiplexing, dense wavelength division multiplexing) optical modules, where one virtual channel corresponds to one or more time slots of one ODTUk, a value m of the time slot depends on a rate of a virtual channel.

2. Distribute a received data flow into n virtual channels in a unit of 66B block, synchronously map the n virtual channels one to one to n ODUflexes, synchronously add a marker LLM to each of the n ODUflexes to form ODUflex-nv-like ODUflexes, map the n ODUflexes to n ODTUk-.mTSs one to one synchronously, multiplex the n ODTUk-.mTSs to multiple OPUks, encapsulate each OPUk to an ODUk and an OTUk in turn, and transport OTUks over multiple OTUk DWDM optical modules, where one ODUflex corresponds to one or more time slots of one ODTUk and a value m of the time slot depends on a rate of a virtual channel.

Figures 1, 2:
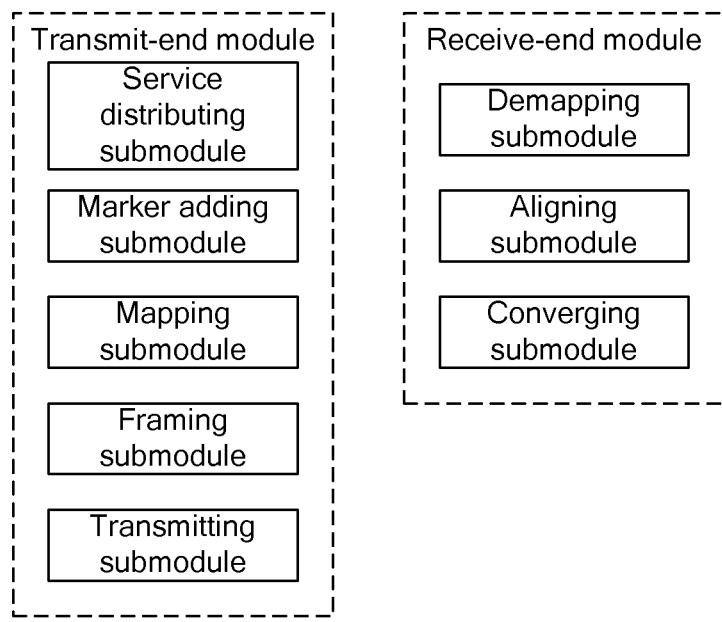
FIG. 1 is a schematic diagram of a modular structure of an OTN frame in the prior art.
FIG. 2 is a diagram of a module of an apparatus for transporting an ultra-high-speed Ethernet service according to the present invention.

As shown in FIG. 2, which is a diagram of a module of an apparatus for transporting an ultra-high-speed Ethernet service, the following describes a technical solution of the present invention based on the apparatus. The apparatus includes a transmit-end module and a receive-end module, where the transmit-end module includes a service distributing submodule, a marker adding submodule, a mapping submodule, a framing submodule, and a transmitting submodule; and the receive-end module includes a demapping submodule, an aligning submodule, and a converging submodule.

Figure 3:
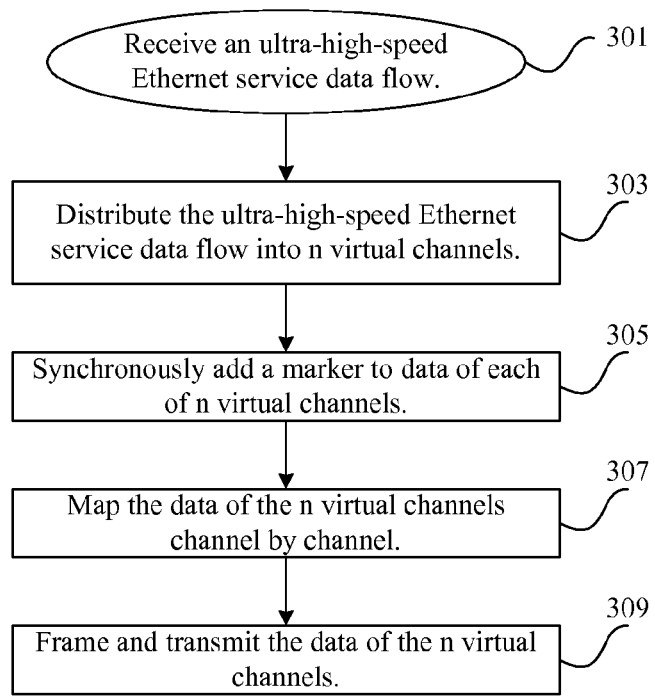
FIG. 3 is a flowchart of a method for transporting an ultra-high-speed Ethernet service in a transmitting direction according to the present invention.

In a transmitting direction, as shown in FIG. 3, a technical solution of the present invention includes:

Step 1: The service distributing submodule distributes an ultra-high-speed Ethernet service into n virtual channels, for example, distributes the ultra-high-speed Ethernet service into n virtual channels in a unit of 66B block. In this case, the unit is not limited to a 66B block; and in the future, a new block may be defined, for example, a 512B block or a 513B block.

Figure 4:
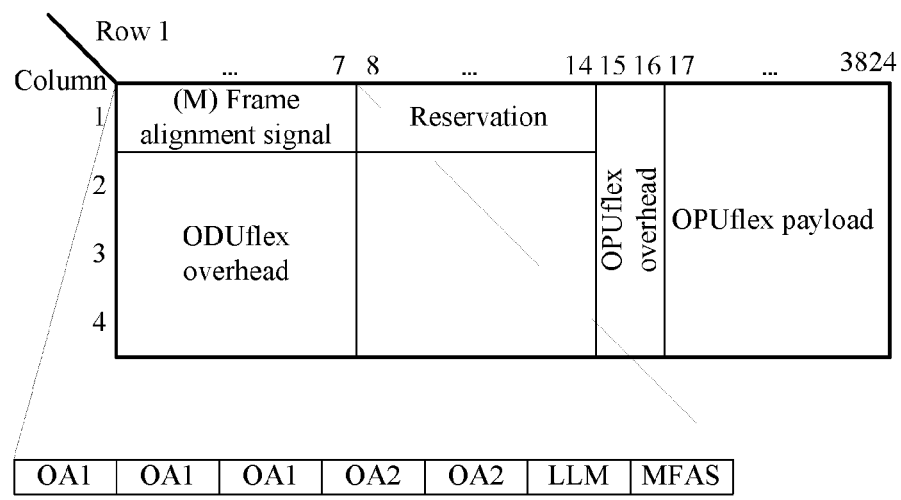
FIG. 4 is a schematic diagram of a position for adding a marker LLM to an OTN frame according to the present invention.

Step 2: The marker adding submodule adds a marker to the n virtual channels synchronously; for example, as shown in FIG. 4, adds a marker LLM to an align marker of each of the n virtual channels synchronously, or adds a marker LLM to an overhead of an encapsulating container ODUflex.

Step 3: The mapping submodule maps data of the n virtual channels channel by channel, for example, synchronously maps the data of the n virtual channels to an n ODTUk.mTSs one to one by a GMP (Generic Mapping Procedure, generic mapping procedure), multiplexes the n ODTUk.mTSs to multiple OPUks, encapsulates a GMP mapping overhead (such as Cm and cnd) into an overhead of an OPUk; synchronously maps the data of the n virtual channels one to one to n ODUflexes by a BMP (Bit Synchronous Mapping Procedure, bit synchronous mapping procedure) to form ODUflex-nv-like ODUflexes, maps the n ODUflexes one to one to the n ODTUk.mTSs, and multiplexes the n ODTUk-.mTSs to multiple OPUks.

There is no strict sequential relationship between step 2 and step 3, that is, the data of the n virtual channels may be encapsulated into the OPUflex first, and then the marker LLM is added to data of each virtual channel.

Step 4: The framing submodule frames the data of the n virtual channels and the transmitting module transmits the data of the n virtual channels, for example, encapsulates each OPUk into an ODUk and an OTUk in turn, and transportsOTUks over a multiple OTUk DWDM optical modules.

Figure 5:
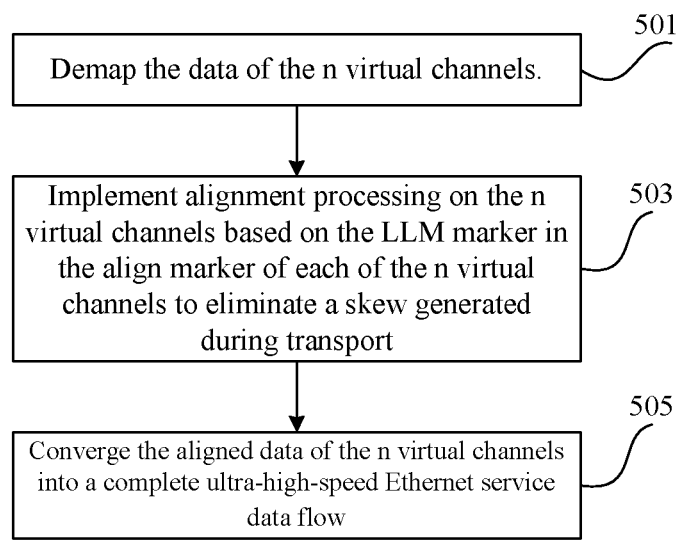
FIG. 5 is a flowchart of a method for transporting an ultra-high-speed Ethernet service in a receiving direction according to the present invention.

In a receiving direction, as shown in FIG. 5, a technical solution of the present invention includes:

Step 1: The demapping submodule demaps the data of the n virtual channels, for example, demaps the data of the n virtual channels from OPUks.

Step 2: The aligning submodule implements alignment processing on the n virtual channels based on the LLM marker in the align marker AM of each of the n virtual channels to eliminate a skew generated during transport.

Step 3: The converging submodule converges the aligned data of the n virtual channels into a complete ultra-high-speed Ethernet service data flow.

The following describes the technical solution of the present invention based on specific embodiments.

Figure 6:
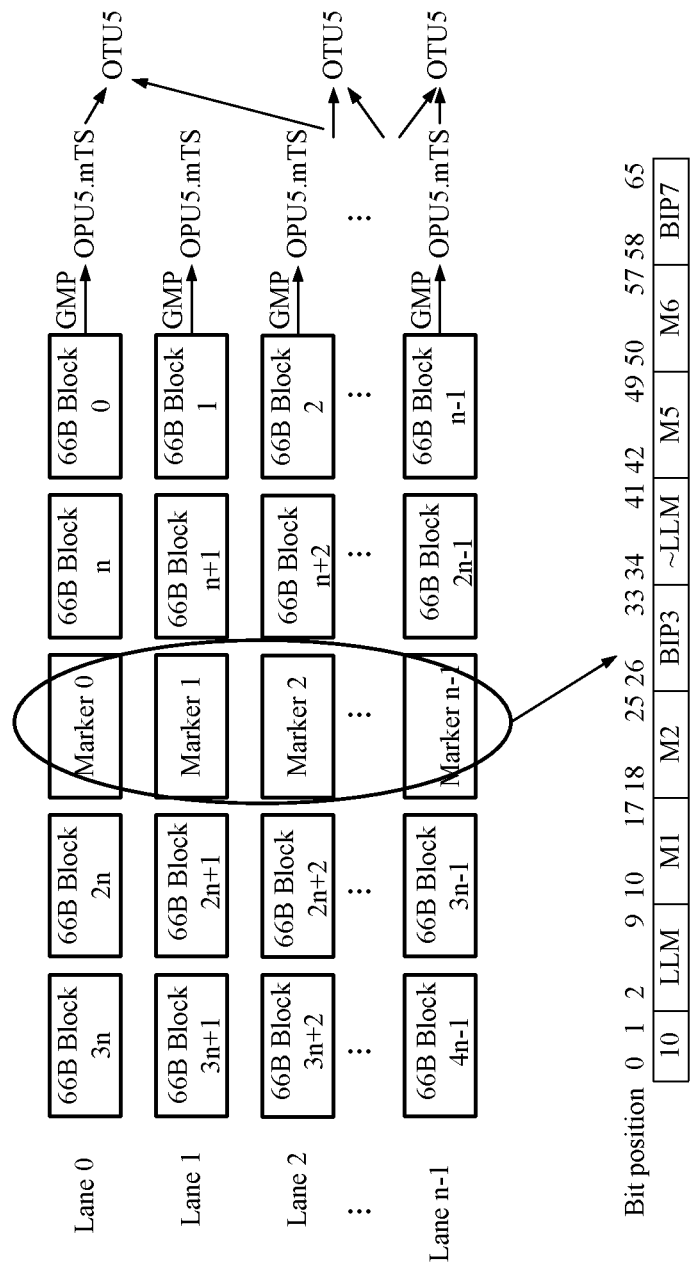
FIG. 6 is a schematic diagram of a channelized transport of a 1TE Ethernet service over an ODU5 according to Embodiment 1 of the present invention.

FIG. 6 shows a method for implementing channelized transport of a 1TE Ethernet service (1TE over ODU5) over an ODU5 in Embodiment 1.

Figure 7:
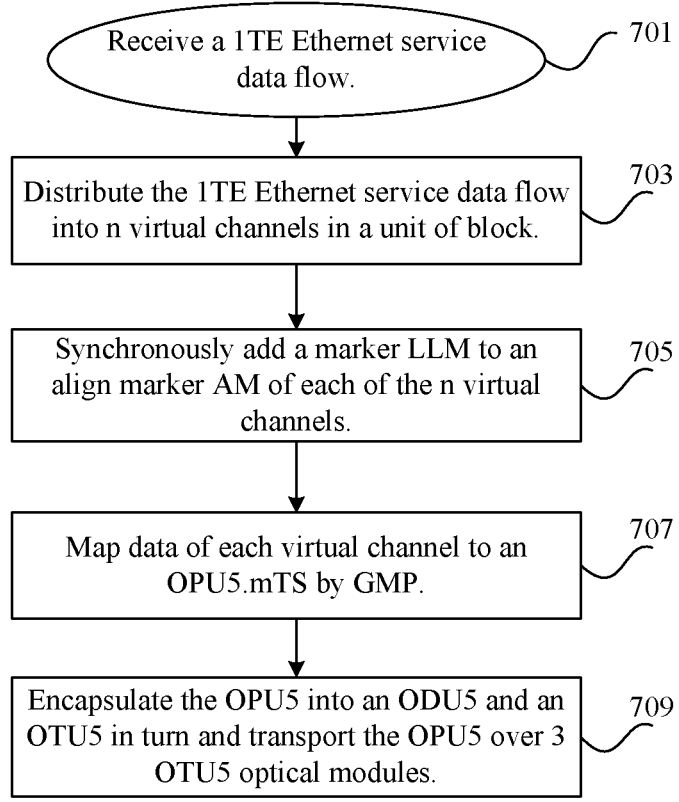
FIG. 7 is a flowchart of a method for transporting a 1TE Ethernet service over an ODU5 in a transmitting direction according to Embodiment 1 of the present invention.

In a transmitting direction, as shown in FIG. 7, the method includes the following steps:

Step 1: Distribute a 1TE Ethernet service data flow into n virtual channels in a unit of 66B block, that is, lane0~lane (n−1), where a value of n is not limited and depends on limitation of a future 1TE Ethernet service standard on the number of virtual channels. For example, the 1TE Ethernet service data flow is distributed into 200 virtual channels in a unit of 66B block, where a rate of each virtual channel is 5 Gbit/s.

Step 2: Add a marker LLM to an align marker AM of each of the n virtual channels synchronously, that is, add a marker LLM to corresponding bits Marker 0~Marker(n−1) of an align marker AM. An adding manner may be replacing an existing Marker0 position with a marker LLM, where a value of the marker LLM ranges from 0 to 225. To hold a balance between the numbers of 0s and 1s, place a marker LLM at a position of Marker0, and a marker ~LLM at a position of Marker4 (the ~LLM is a NOT result of a binary value of the LLM). Positions where markers LLMs are added include but are not limited to the positions of Marker0 and Marker4.

Step 3: Map data of each virtual channel to an OPU5.mTS by a GMP, where an OPU5 is at a rate level of 400 Gbit/s, and the data of each virtual channel occupies 4 1.25 Gbit/s timeslot bandwidths, namely, OPU5.4TS.

Step 4: Encapsulate the OPU5 into an ODU5 and an OTU5 in turn, and transport OTU5s over 3 OTU5 DWDM optical modules. 1TE occupies 800 1.25 Gbit/s timeslot bandwidths and each OTU5 has 320 1.25 Gbit/s timeslot bandwidths, and therefore, the 1TE Ethernet service actually occupies 2.5 OTU5 bandwidths and the remaining 0.5 OTU5 bandwidths may be used for carrying other services.

Figure 8:
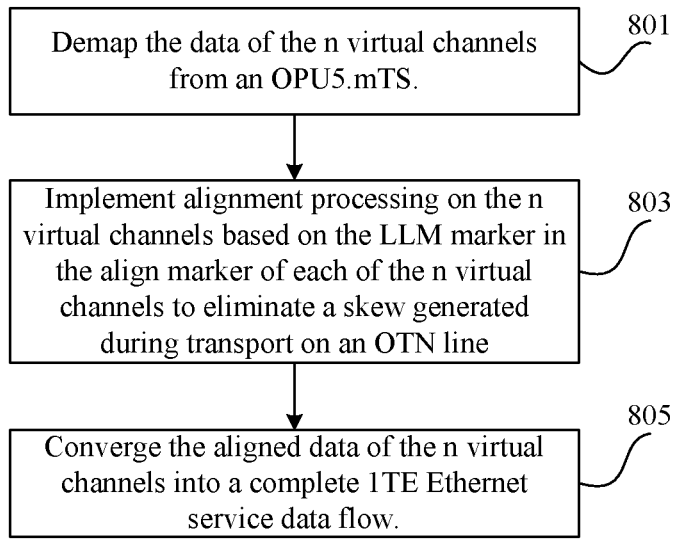
FIG. 8 is a flowchart of a method for transporting a 1TE Ethernet service over an ODU5 in a receiving direction according to Embodiment 1 of the present invention.

In a receiving direction, as shown in FIG. 8, the method includes the following steps:

Step 1: Demap the data of the n virtual channels from the OPU5.mTS.

Step 2: Implement alignment processing on the n virtual channels based on the LLM marker in the align marker AM of each of the n virtual channels to eliminate a skew generated during transport on an OTN line. Take that a value range of an LLM is from 0 to 255, and an interval of align markers AMs is 16384 66B blocks as an example, the compensation capability of the skew is: the interval between the align markers AMs*(the LLM value range/2)=105 us*256/2=13.44 ms, where 105 us is the interval between the align markers AMs.

Step 3: Converge the data of the n virtual channels into a complete 1TE data flow.

Figure 9:
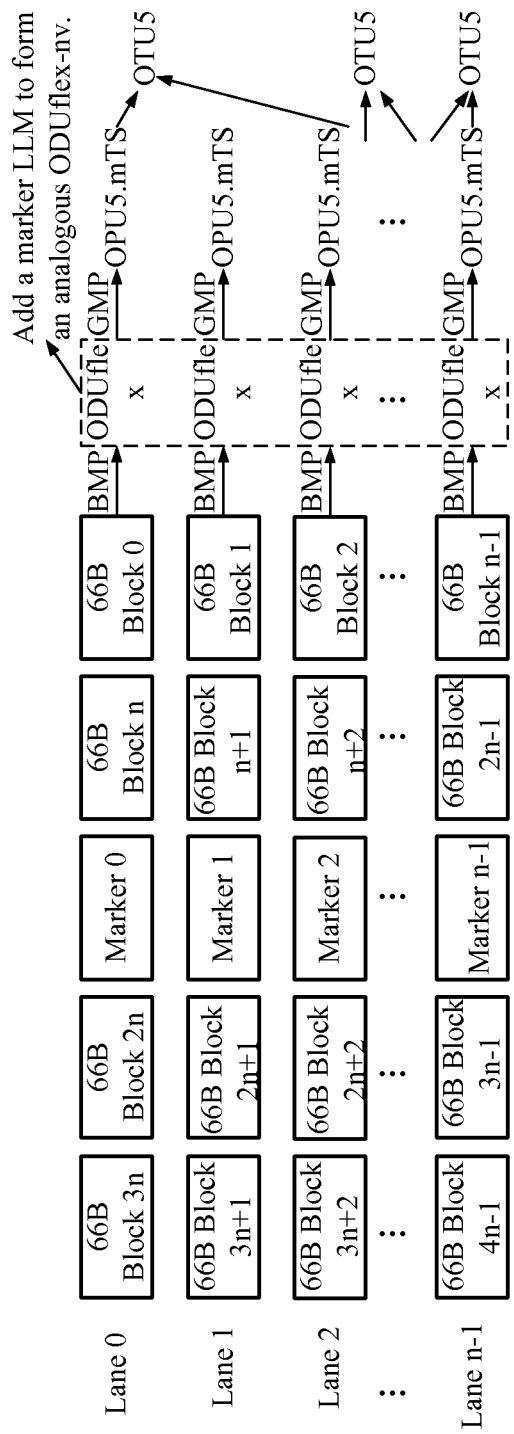
FIG. 9 is a schematic diagram of a channelized transport of a 1TE Ethernet service over an ODU5 according to Embodiment 2 of the present invention.

FIG. 9 shows a method for implementing channelized transport of a 1TE Ethernet service (1TE over ODU5) over an ODU5 in Embodiment 2.

Figure 10:
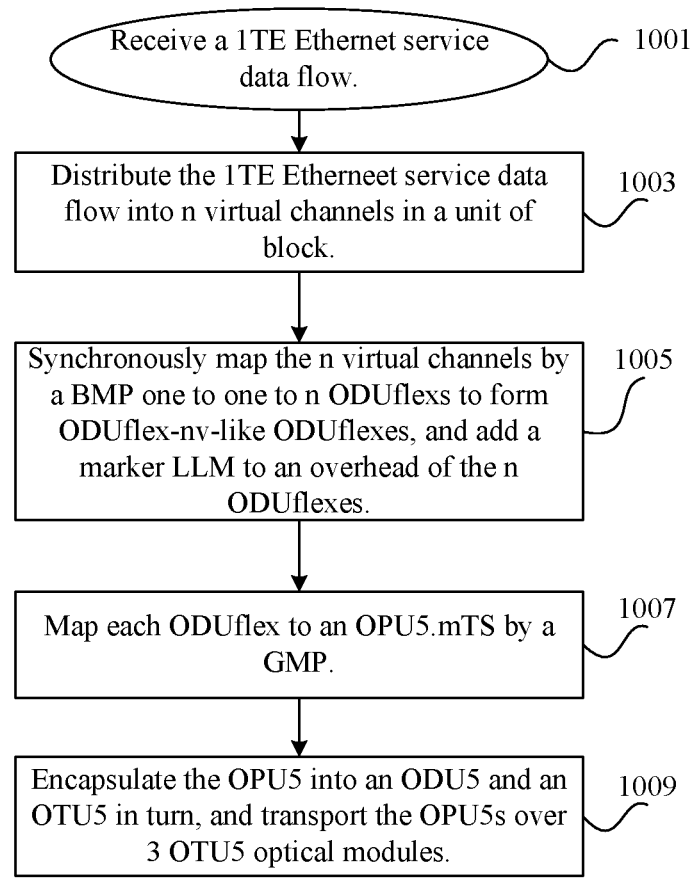
FIG. 10 is a flowchart of a method for transporting a 1TE Ethernet service over an ODU5 in a transmitting direction according to Embodiment 2 of the present invention.

In a transmitting direction, as shown in FIG. 10, the method includes the following steps:

Step 1: Distribute a 1TE Ethernet service data flow into n virtual channels in a unit of 66B block, that is, lane0~lane (n−1), where a value of n is not limited and depends on limitation of a future 1TE Ethernet service standard on the number of virtual channels. For example, the 1TE Ethernet service data flow is distributed into 200 virtual channels in a unit of 66B block, where a rate of each virtual channel is 5 Gbit/s.

Step 2: Map the data of the n virtual channels by a BMP one to one to n ODUflexes synchronously to form ODUflex-nv-like ODUflexes. Add a marker LLM to an overhead of each of the n ODUflexes synchronously, and as shown in FIG. 4, a adding manner may be adding the marker LLM at the third OA2 byte of a frame header of the ODUflex, and replacing an existing OA2 byte with the marker LLM, where a value of the marker LLM ranges from 0 to 239. The value range of the marker LLM is not limited and depends on the compensation capability of a required skew, and the compensation capability of the skew is: ODUflex frame period* (the LLM value range/2).

Step 3: Map each ODUflex to an OPU5.mTS by a GMP, where, an OPU5 is at a rate level of 400 Gbit/s, and each ODUflex occupies 4 1.25 Gbit/s timeslot bandwidths, that is, OPU5.4TS.

Step 4: Encapsulate the OPU5 into an ODU5 and an OTU5 in turn, and transport OTU5s over 3 OTU5 DWDM optical modules. 1TE occupies 800 1.25 Gbit/s timeslot bandwidths, each OTU5 has 320 1.25 Gbit/s timeslot bandwidths, and therefore, the 1TE Ethernet service actually occupies 2.5 OTU5 bandwidths, and the remaining 0.5 OTU5 bandwidths may be used for carrying other services.

Figure 11:
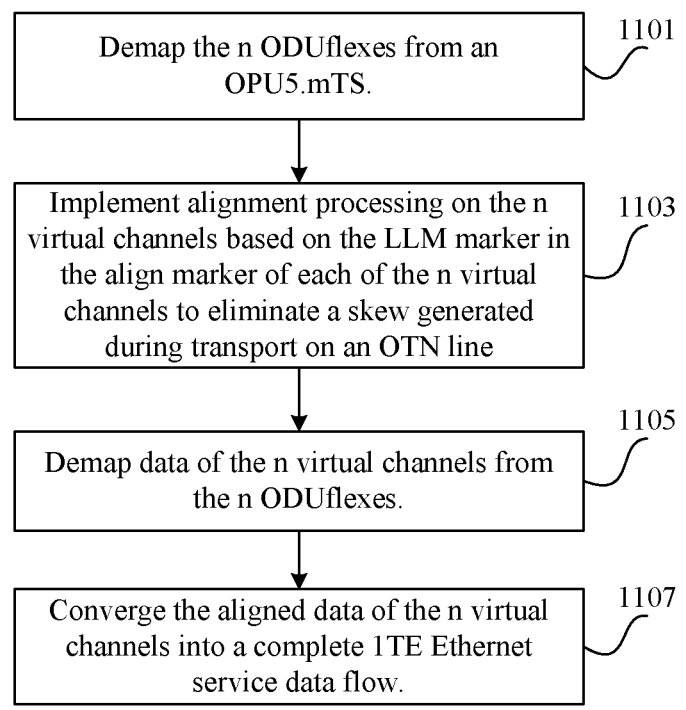
FIG. 11 is a flowchart of a method for transporting a 1TE Ethernet service over an ODU5 in a receiving direction according to Embodiment 2 of the present invention.

In a receiving direction, as shown in FIG. 11, the method includes the following steps:

Step 1: Demap the n ODUflexes from OPU5.mTSs.

Step 2: Based on the LLM marker in an overhead of n ODUflexes, implement aligning processing on the n virtual channels, to eliminate a skew generated during transport on an OTN line. To increase the compensation capability of the skew, align the n ODUflexes based on a MFAS (Multiframe Alignment Signal, multiframe alignment signal) of an ODUflex and an LLM. Take that each channel of virtual channel is mapped to an ODUflex at a rate level of 5 Gbit/s (the frame period T of the ODUflex is 25 us), and a value of the LLM ranges from 0 to 239 as an example, the compensation capability of the skew is: the frame period T of the ODUflex*LCM(256, 240)/2=25 us*3840/2=48 ms, where 256 is a multiframe period T of the ODUflex, and LCM (256, 240) is the lowest common multiple of 256 and 240.

Step 3: Demap the data of the n virtual channels from the n ODUflexes.

Step 4: Converge the aligned data of the n virtual channels into a complete 1TE data flow.

The OPU5, ODU5, and OTU5 described in the forgoing embodiments are OTN frames whose rate levels are higher than 100 Gbit/s, for example, an OTN frame at a rate level of 400 Gbit/s, which has the following features:

1. inheriting an original frame structure and multiplexing system of an OTN frame;

2. being divided into 320 1.25 Gbit/s timeslot bandwidths; and 3. being capable of carrying an LO ODUj (lower order ODUj, lower order ODUj), for example, 320 ODU0, 160 ODU1, 40 ODU2, 10 ODU3, 4 ODU4, and arbitrary number of ODUflexes.

The OTU5 described in the forgoing embodiments includes but is not limited to the rate level of 400 Gbit/s, and may be expanded to an OTN frame at an any-rate level, for example, an OTUflex at an any-rate level. The rate level of the OTUflex is higher than 100G, and may be flexibly adjusted based on the utilization of optical spectrum resources of an optical channel. The rate level of the OTUflex depends on allocation of optical spectrum resources of the optical channel. The optical spectrum resources are fixed, and may be flexibly allocated to multiple optical wavelengths. The optical wavelength that occupies more optical spectrum resources has a higher OTUflex rate level. For example, a 1TE high-speed Ethernet service may be transmitted over 4 OTUflex DWDM optical modules, where 2 OTUflexs at a rate level of 200 Gbit/s and 3 OTUflexs at a rate level of 300 Gbit/s are included.

Figure 12:
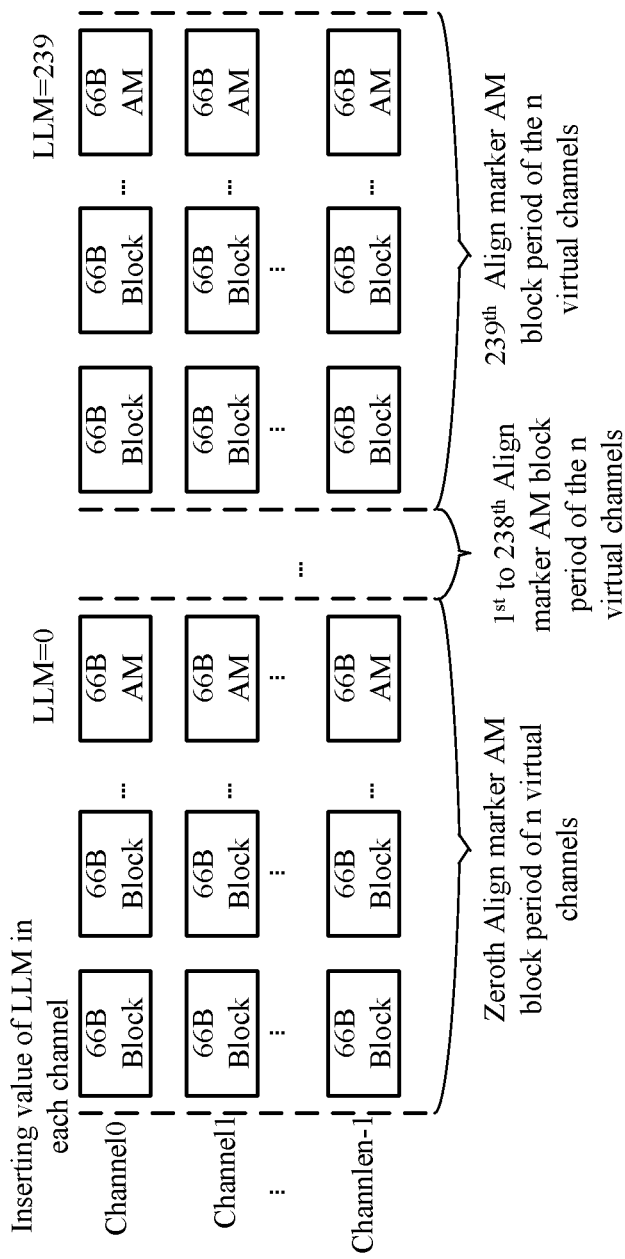
FIG. 12 is a schematic diagram for adding a marker LLM to an align marker AM of a virtual channel according to an embodiment of the present invention.

The adding manner and value range of the LLM marker described in the forgoing embodiment include but are not limited to the following descriptions:

1. As shown in FIG. 12, a block spacing of the align marker AM of the n virtual channels is taken as a period, a marker LLM is added to a block of the align marker AM of the n virtual channels simultaneously, where the value of the marker LLM ranges from 0 to 239 in an ascending order, and is periodically inserted taking 0 to 239 as a period.

Figure 13:
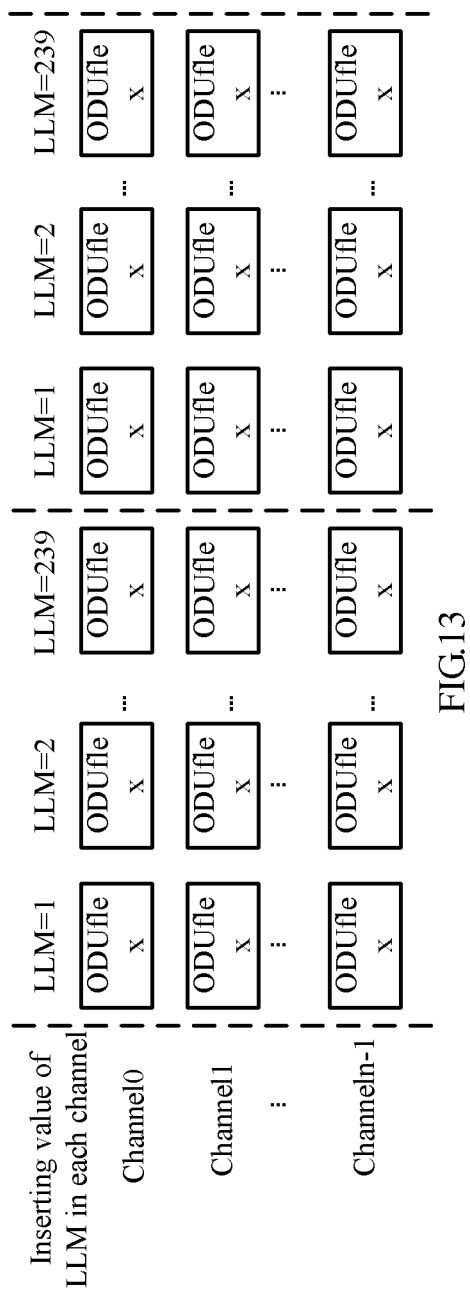
FIG. 13 is another schematic diagram for adding a marker LLM to an overhead of an ODUflex frame according to an embodiment of the present invention.

2. As shown in FIG. 13, a frame of the n ODUflexes is taken as a period, an LLM marker is added at the third OA2 byte of a frame header of each of the n ODUflexes, where the value of the LLM ranges from 0 to 239 in an ascending order, is periodically inserted taking 0 to 239 as a period, and the n ODUflex frames are strictly aligned.

Figure 14:
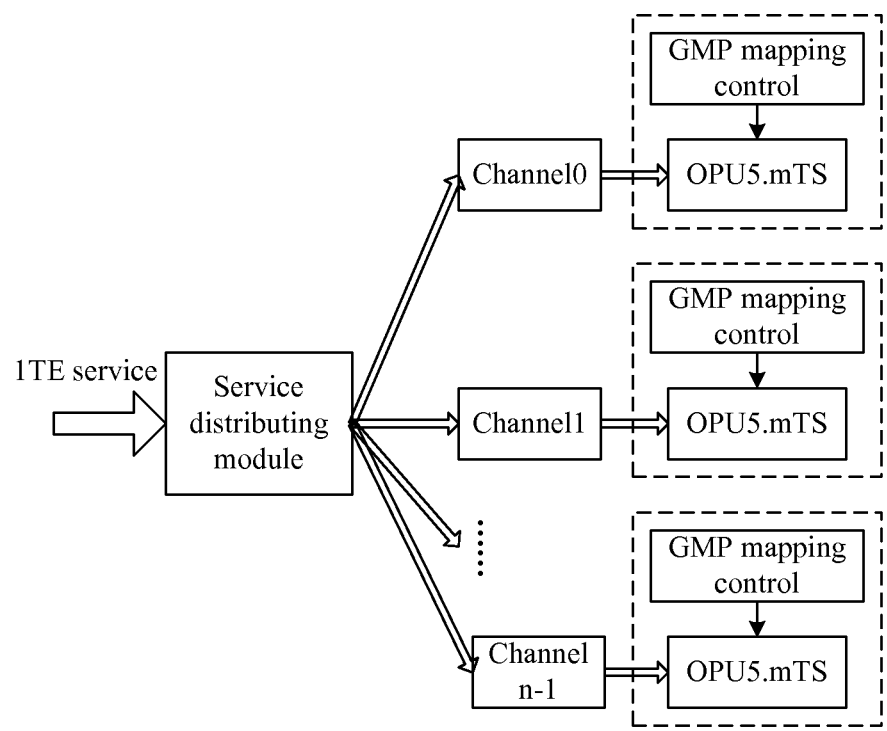
FIG. 14 is a schematic diagram for separately mapping data of virtual channels according to an embodiment of the present invention.

In the forgoing embodiment, the processing of synchronously mapping the data of the n virtual channels to the OPU5.mTS includes but is not limited to the following manners:

1. Separate mapping: as shown in FIG. 14, each virtual channel maps data of the virtual channel to an OPU5.mTS payload area by its own GMP.

Figure 15:
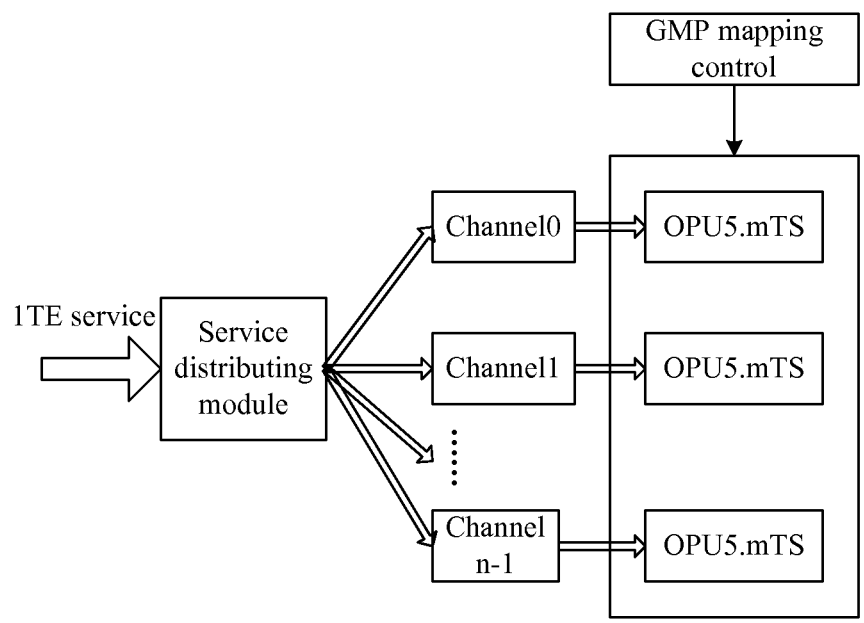
FIG. 15 is another schematic diagram for mapping data of virtual channels together according to an embodiment of the present invention.

2. Unified mapping: as shown in FIG. 15, the n virtual channels uniformly map the data of the n virtual channels to payload area of OPU5.mTSs by a GMP, and a virtual channel corresponds to one or more timeslots, which depends on the rate of a virtual channel.

In the forgoing embodiment, a mapping path from the n virtual channels to the OPU5.mTSs includes but is not limited to the following descriptions:

1. The n virtual channels are mapped to the OPU5.mTSs by a GMP.

2. The n virtual channels are mapped to the n ODUflexes by a BMP first, and then the n ODUflexes are mapped to the OPU5.mTSs by the GMP.

3. The n virtual channels are mapped to the n ODUflexes by the BMP first, then the n ODUflexes are mapped to an LO OPUk.mTSs by the GMP, and after that the LO OPUks are multiplexed to HO OPU5s (higher order OPU5, higher order OPU5).

An LO OPUk includes an OPU1, an OPU2, an OPU3, an OPU4, an OPU2e, an OPU3e, and so on.

The technical solution of the present invention is not limited to transport a 1TE Ethernet service over an OPU5, and is also applicable to transport a 400GE Ethernet service over an OPU4.

Step 1: Distribute a received 400GE Ethernet data flow into n virtual channels in a unit of 66B block, synchronously add a marker LLM to an existing align marker AM of each of the n virtual channels, and map each virtual channel to multiple OPU4.mTSs; and after that, the multiple OPU4s are encapsulated into an ODU4s and OTU4s in turn, and the OTUs are transported over a OTU4 DWDM optical modules.

Step 2: Distribute the received 400GE Ethernet data flow into the n virtual channels in a unit of 66B block, map the n virtual channels to n ODUflexes one to one respectively, and add the marker LLM to an overhead of the ODUflex synchronously to form ODUflex-nv-like ODUflexes; and after that, each ODUflex is mapped to multiple OPU4.mTSs, the multiple OPU4s are encapsulated into an ODU4s and an OTU4s in turn, and the OTU4s are transported over multiple OTU4 DWDM optical modules.

The method does not make any changes to a data flow, adopts channelized transparent transport, and implements mapping processing on a high-speed Ethernet service so as to reduce its complexity to a level for processing a low-rate Ethernet service, reduce implementation difficulty, and make it easy to process; in addition, the method mainly uses the multiplexing system of an OTN, which can reduce the cost on hardware.

Persons of ordinary skill in the art may understand that, all or a part of the processes of the method in the preceding embodiments may be implemented by a computer program instructing relevant hardware. The program may be stored in a computer readable storage medium. When the program is run, the program may include the processes of the methods in the forgoing embodiments. The storage medium may be a magnetic disk, an optical disk, a read-only memory (Read-Only Memory, ROM), or a random access memory (Read Access Memory, RAM), and so on.

Only exemplary embodiments of the present invention are described above. It should be noted that, improvements and modifications may be made by persons of ordinary skill in the art without departing from the principles of the present invention, and the improvements and modifications shall be construed as falling within the protection scope of the present invention.

What is claimed is:

1. A method for transporting an ultra-high-speed Ethernet service, comprising:
   distributing an ultra-high-speed Ethernet service data flow into n virtual channels, wherein a rate of the ultra-high-speed Ethernet service data flow is higher than a rate of 100GE;
   synchronously adding logical lane markers to either align markers of the n virtual channels, respectively, or an overhead of an encapsulating container of bit-rate independent optical channel data units, respectively;
   mapping data of the n virtual channels channel by channel by one of
      synchronously mapping the data of the n virtual channels one to one to n optical channel data tributary units, including m time slots, and
      synchronously mapping the data of the n virtual channels one to one to n bit-rate independent optical channel data units to form ODUflex-nv-like ODUflexes, and mapping the n bit-rate independent optical channel data units one to one to n optical channel data tributary units, including m time slots;
   multiplexing the n optical channel data tributary units to multiple optical channel payload units;
   framing and transmitting the data of the n virtual channels;
   implementing alignment processing on the n virtual channels based on a logical lane marker in an align marker of each of the n virtual channels, to eliminate a skew generated during transport and produce aligned data; and
   converging the aligned data of the n virtual channels into a complete ultra-high-speed Ethernet service data flow.

2. The method according to claim 1, wherein said framing and transmitting the data of the n virtual channels comprises: encapsulating each optical channel payload unit into an optical channel data unit and an optical channel transport unit in turn, and transporting optical channel transport units over multiple optical channel transport unit dense wavelength division multiplexing optical modules.

3. The method according to claim 1, wherein said distributing the ultra-high-speed Ethernet service data flow into n virtual channels comprises: distributing the ultra-high-speed Ethernet service data flow into n virtual channels in a unit of block.

4. The method according to claim 1, further comprising demapping the data of the n virtual channels from optical channel payload units prior to the alignment processing of the n virtual channels.

5. A system for transporting an ultra-high-speed Ethernet service, comprising:
   a mapping processor, configured to
      distribute an ultra-high-speed Ethernet service data flow into n virtual channels, wherein a rate of the ultra-high-speed Ethernet service data flow is higher than a rate of 100GE,
      synchronously add logical lane markers to one of align markers of the n virtual channels, respectively, and an overhead of an encapsulating container of bit-rate independent optical channel data units, respectively, each logical lane marker providing an align marker of one of the n virtual channels, thereby enabling alignment processing on the n virtual channels which eliminates skew generated during transport and produces aligned data;
      map the data of the n virtual channels channel by channel by one of
         synchronously mapping the data of the n virtual channels one to one to n optical channel data tributary units, including m time slots, and
         synchronously mapping the data of the n virtual channels one to one to n bit-rate independent optical channel data units to form ODUflex-nv-like ODUflexes, and mapping the n bit-rate independent optical channel data units one to one to n optical channel data tributary units, including m time slots,
      multiplex the n optical channel data tributary units to multiple optical channel payload units, and
      frame the data of the n virtual channels to produce framed data;
   a transmitter configured to transmit the framed data of the n virtual channels; and
   a demapping processor, configured to
      implement alignment processing on the n virtual channels based on a logical lane marker in an align marker of each of the n virtual channels, to eliminate a skew generated during transport and produce aligned data; and
      converge the aligned data of the n virtual channels into a complete ultra-high-speed Ethernet service data flow.

6. The apparatus according to claim 5, wherein the framing, by the framing submodule, the data of the n virtual channels comprises: encapsulating each optical channel payload unit into an optical channel data unit and an optical channel transport unit in turn.

7. The apparatus according to claim 5, wherein: the step of distributing the ultra-high-speed Ethernet service data flow into n virtual channels comprises: distributing the ultra-high-speed Ethernet service data flow into n virtual channels in a unit of block.

8. The apparatus according to claim 5, wherein the transmitting submodule comprises an optical channel transport unit dense wavelength division multiplexing optical module.

9. An apparatus for transporting an ultra-high-speed Ethernet service, comprising:
   a mapping processor configured to
      distribute Ethernet service data, flowing at a rate higher than 100GE, into n virtual channels;
      map channel data of the n virtual channels, channel by channel, to produce mapped data;
      frame the mapped data to produce framed data;
   a transmitter configured to transmit the framed data of the n virtual channels; and
   a demapping processor configured to
      demap the framed data of the n virtual channels,
      align, based on a logical lane marker in an align marker of each of the n virtual channels, the n virtual channels to eliminate a skew generated during transport and produce aligned data, and
      converge the aligned data of the n virtual channels into a complete ultra-high-speed Ethernet service data flow.

10. A non-transitory computer storage medium for transporting an ultra-high-speed Ethernet service, wherein the computer storage medium stores program code and the program code is run on a computer device to execute the method according to claim 1.

* * * * *